US012748603B2

(12) United States Patent
Allouche et al.

(10) Patent No.: US 12,748,603 B2
(45) Date of Patent: Sep. 29, 2026

(54) COMPUTING SYSTEM FOR EXECUTING QUANTUM PROGRAMS ON ANALOG AND DIGITAL QUANTUM COMPUTERS

(71) Applicant: BULL SAS, Les Clayes sous Bois (FR)

(72) Inventors: Cyril Allouche, Saint Arnoult en Yvelines (FR); Thomas Ayral, Versailles (FR); Simon Martiel, Versailles (FR)

(73) Assignee: BULL SAS, Les Clayes sous Bois (FR)

( * ) Notice: Subject to any disclaimer, the term of this patent is extended or adjusted under 35 U.S.C. 154(b) by 312 days.

(21) Appl. No.: 17/941,149

(22) Filed: Sep. 9, 2022

(65) Prior Publication Data

US 2023/0084607 A1 Mar. 16, 2023

(51) Int. Cl.
*G06F 9/445* (2018.01)
*G06N 10/80* (2022.01)

(52) U.S. Cl.
CPC ......... *G06F 9/44505* (2013.01); *G06N 10/80* (2022.01)

(58) Field of Classification Search
CPC .... G06F 9/44505; G06N 10/00; G06N 10/20; G06N 10/80
See application file for complete search history.

(56) References Cited

U.S. PATENT DOCUMENTS 5,016,280 A * 5/1991 Engebretson ............ H04R 3/04 381/83
5,357,251 A * 10/1994 Morley, Jr. ........ H03H 17/0261 341/172
11,175,971 B1 * 11/2021 Lee ......................... G06F 9/547
11,494,681 B1 * 11/2022 Peterson ................. G06F 15/16
11,521,103 B1 * 12/2022 Reagor .................. G06N 10/60
(Continued)

FOREIGN PATENT DOCUMENTS

EP 3425497 A1 1/2019
WO WO-2022104671 A1 * 5/2022 ............. G06F 17/16

OTHER PUBLICATIONS

Warren, Richard H., Gates for Adiabatic Quantum Computing, last revised Aug. 26, 2014, retrieved from https://arxiv.org/abs/1405.2354, pp. 1-19 (Year: 2014).*
(Continued)

*Primary Examiner* — Kevin L Young
*Assistant Examiner* — Jennifer Marie Gutman
(74) *Attorney, Agent, or Firm* — Meagher Emanuel Laks Goldberg & Liao LLP

(57) ABSTRACT

The present disclosure relates to a computing system comprising a classical computer, an analog quantum computer and a digital quantum computer, said computing system comprising:
a digital quantum processing, DQP, module comprising an input interface for receiving a quantum circuit to be executed by the digital quantum computer;
an analog quantum processing, AQP, module comprising an input interface for receiving a temporal schedule to be executed by the analog quantum computer;
a digital to analog converting, DAC, module comprising an input interface for receiving a quantum circuit and an output interface for outputting a temporal schedule;
wherein a same format is used on the input interfaces of both the DQP module and the DAC module, and a same format is used on both the output interface of the DAC module and the input interface of the AQP module.

15 Claims, 3 Drawing Sheets

(56) References Cited

U.S. PATENT DOCUMENTS

| | | | | |
|---|---|---|---|---|
| 12,456,079 | B2 * | 10/2025 | Bolt | G06Q 10/04 |
| 2018/0330264 | A1 * | 11/2018 | Lanting | G06N 10/00 |
| 2018/0365585 | A1 * | 12/2018 | Smith | G06N 10/80 |
| 2020/0027029 | A1 * | 1/2020 | Linvill | G06N 10/20 |
| 2020/0242295 | A1 * | 7/2020 | Martiel | G06F 30/398 |
| 2020/0266234 | A1 * | 8/2020 | Boothby | H10N 60/12 |
| 2020/0401923 | A1 * | 12/2020 | Javadiabhari | H03M 1/662 |
| 2020/0410343 | A1 * | 12/2020 | Niu | G06N 10/00 |
| 2021/0012233 | A1 * | 1/2021 | Gambetta | G06F 8/44 |
| 2021/0158232 | A1 * | 5/2021 | Bolt | G06N 10/00 |
| 2021/0311442 | A1 * | 10/2021 | Biercuk | G06N 10/40 |

OTHER PUBLICATIONS

Hen, Itay, Quantum gates with controlled adiabatic evolutions, Feb. 2015, Published in Phys. Rev. A, vol. 91, issue 2, pp. 022309-1-022309-5 (Year: 2015).*

European Search Report for corresponding EP Application No. 21308279, dated Mar. 4, 2022.

Regan et al., "Automatically Translating Quantum Programs from a Subset of Common Gates to an Adiabatic Representation", Advances in Databases and Information Systems, Lecture Notes in Computer Science, Lect.Notes Computer, pp. 146-161, XP047510764, May 23, 2019.

McCaskey et al., "A Language and Hardware Independent Approach to Quantum-Classical Computing", arxiv.org, Cornell University Library, 201 Olin Library Cornell University Ithaca, NY 14853, pp. 1-15, Jul. 31, 2018.

Nguyen et al., "Enabling Pulse-level Programming, Compilation, and Execution in XACC", pp. 1-13, KP055896370, Mar. 26, 2020.

Yu et al., "Exact Equivalence between Quantum Adiabatic Algorithm and Quantum Circuit Algorithm", arxiv.org, Cornell University Library, 201 Olin Library Cornell University, Ithaca, NY 14853, XP081060308, Jun. 23, 2017.

Van Dam et al., "How Powerful is Adiabatic Quantum Computation?", arxiv.org, Cornell University Library, 201 Olin Library Cornell University, Ithaca, NY 14853, XP080085388, Jun. 1, 2002.

* cited by examiner

COMPUTING SYSTEM FOR EXECUTING QUANTUM PROGRAMS ON ANALOG AND DIGITAL QUANTUM COMPUTERS

TECHNICAL FIELD

This disclosure relates to quantum computing and relates more specifically to a computing system for executing quantum programs on quantum computers which use different quantum computing models.

BACKGROUND

Quantum computing, i.e. using quantum computers, is gaining more and more interest as it is expected to solve some problems way faster than classical computing, i.e. using classical computers. However, some other problems are also solved more efficiently by classical computing, such that there is a need for hybrid architectures, i.e. architectures which use both classical computing resources and quantum computing resources.

An example of hybrid architecture is given by the patent application EP 3425497 A1, in which a classical computer is configured as a master which controls a quantum computer which is configured as a slave.

There exist different quantum computing resources providers, which allow remote access to quantum computers. However, the quantum computers which can be accessed remotely can be different in terms of e.g. number of qubits, connectivity between qubits, available quantum gates, etc.

More importantly, these quantum computers can also be different in terms of underlying quantum computing model, whether quantum gate-based (a.k.a. digital quantum computing) or non-quantum gate based (quantum annealing or adiabatic quantum computation, a.k.a. analog quantum computing).

Currently, a quantum program is developed specifically for a specific quantum computer and cannot be reused for another quantum computer.

However, developers of quantum programs may not require that a specific quantum computer is used for executing the program, as long as it can be executed on any quantum computer regardless e.g. digital or analog.

Also, analog and digital quantum frameworks may have respective advantages and, currently, it is not possible to benefit from the advantages of both environments when developing a quantum program.

BRIEF SUMMARY

The present disclosure aims at improving the situation. In particular, the present disclosure aims at overcoming at least some of the limitations of the prior art discussed above, by proposing a solution that enables unifying analog and digital quantum frameworks.

According to a first aspect, the present disclosure relates to a computing system for executing quantum programs, said computing system comprising a classical computer, an analog quantum computer configured to execute quantum programs expressed as temporal schedules and a digital quantum computer configured to execute quantum programs expressed as quantum circuits. Said computing system comprises:

- a digital quantum processing module comprising an input interface for receiving a quantum program expressed as a quantum circuit to be executed by the digital quantum computer;

- an analog quantum processing module comprising an input interface for receiving a quantum program expressed as a temporal schedule to be executed by the analog quantum computer.

The computing system further comprises a digital to analog converting, DAC, module, to be executed by the classical computer, configured to convert a quantum program expressed as a quantum circuit into a quantum program expressed as a temporal schedule, said DAC module comprising an input interface for receiving a quantum circuit to be converted and an output interface for outputting a corresponding temporal schedule, and wherein a same format is used on the input interfaces of both the digital quantum processing module and the DAC module, and a same format is used on both the output interface of the DAC module and the input interface of the analog quantum processing module.

Hence, thanks to the DAC module, a developer may construct a quantum program as a quantum circuit regardless which one among the digital quantum computer and the analog quantum computer will actually execute said quantum program. If the quantum program is executed by the digital quantum computer, it can be provided to the digital quantum computer as a quantum circuit via the digital quantum processing module. If the quantum program is executed by the analog quantum computer, the quantum circuit is first converted, by the DAC module, into a temporal schedule which can be provided to the analog quantum processing module. Since the digital quantum processing module and the DAC module use the same format on their input interfaces, this is transparent to the quantum program developer. In other words, a same application program interface (API) is used for quantum programs expressed as quantum circuits, regardless which one among the digital quantum computer and the analog quantum computer will actually execute said quantum program.

Also, the DAC module uses on its output interface the same format as the input interface of the analog quantum processing module. In other words, the output of the DAC module uses the API of the input of the analog quantum processing module, such that the DAC module can be connected to the analog quantum processing module in a transparent manner, without requiring any changes to the analog quantum processing module used to receive quantum programs expressed as temporal schedules for the analog quantum computer.

In specific embodiments, the computing system can further comprise one or more of the following features, considered either alone or in any technically possible combination.

In specific embodiments, the computing system comprises an analog to digital converting, ADC, module, to be executed by the classical computer, configured to convert a quantum program expressed as a temporal schedule into a quantum program expressed as a quantum circuit, said ADC module comprising an input interface for receiving a temporal schedule to be converted and an output interface for outputting a corresponding quantum circuit, wherein a same format is used on the input interfaces of both the analog quantum processing module and the ADC module, and a same format is used on both the output interface of the ADC module and the input interface of the digital quantum processing module.

Hence, a same API is used for quantum programs expressed as temporal schedule, regardless which one among the digital quantum computer and the analog quantum computer will actually execute said quantum program.

The computing system is therefore adapted to execute a same quantum program expressed as a temporal schedule by using any one of the analog quantum computer and the digital quantum computer via the ADC module.

Also, the computing system is adapted to execute a quantum program expressed as a quantum circuit by using the digital quantum computer via the DAC module connected to the ADC module. Hence, a quantum program expressed as a quantum circuit may be processed by algorithms aiming at optimizing the quantum program, which algorithms can operate in the digital quantum framework or in the analog quantum framework, or both. Hence, this enables to take advantage in the digital quantum framework (of the original quantum circuit) of algorithms which are specific to the analog quantum framework (e.g. quantum optimal control, QOC, analog algorithms, etc.).

In specific embodiments:

- the ADC module is configured to optimize a temporal schedule with respect to a predetermined performance criterion, and to convert the optimized temporal schedule into a quantum circuit; and/or
- the DAC module is configured to optimize a temporal schedule, obtained by converting a quantum circuit, with respect to a predetermined performance criterion, and to output the optimized temporal schedule.

In specific embodiments, the computing system comprises an analog to analog converting, AAC, module, to be executed by the classical computer, configured to optimize a temporal schedule with respect to a predetermined performance criterion, said AAC module comprising an input interface for receiving a temporal schedule and an output interface for outputting a corresponding optimized temporal schedule, wherein the input interface and the output interface of the AAC module use the same format as the input interface of the ADC module.

In such embodiments, the ADC or DAC module may therefore perform only the conversion, while the optimization of the temporal schedule is performed by a different module, i.e. the AAC module. Since common formats are used on the different interfaces, the computing system is adapted to execute a quantum program expressed as a quantum circuit by using the digital quantum computer via the DAC module connected to the AAC module connected to the ADC module connected to the digital quantum processing module.

Also, the Computing System is Adapted to Execute a Same Quantum Program Expressed as a Quantum Circuit by Using the Digital Quantum Computer Via any One of:

- the DAC module connected to the AAC module connected to the ADC module connected to the digital quantum computing module;
- the DAC module connected to the ADC module connected to the digital quantum processing module.

In other words, the AAC module can be included or not without impacting the other modules, in a transparent manner for the developer.

In specific embodiments, the DAC module is configured to perform a calibration phase wherein, for each possible quantum gate that can be included in a quantum circuit to be executed, the DAC module outputs a plurality of candidate elementary schedules to be executed by the analog quantum computer and determines an optimal elementary schedule for said quantum gate by comparing the results provided by the analog quantum computer with a reference result, and wherein the DAC module uses optimal elementary schedules determined for all possible quantum gates for converting a quantum circuit into a temporal schedule.

In specific embodiments, the DAC module is configured to:

- receive a quantum program expressed as a quantum circuit comprising a plurality of quantum gates to be applied to a set of qubits, said quantum gates arranged successively in an execution order;
- determine a temporal planning based on the execution order of the quantum gates of the quantum circuit;
- for each quantum gate or combination of quantum gates: determining an associated elementary schedule based on said quantum gate and based on said temporal planning;
- transmitting a quantum program expressed as a temporal schedule obtained by adding the elementary schedules.

According to a second aspect, the present disclosure relates to a method for executing a quantum program by a computing system according to any one of the previous embodiments of the first aspect of the present disclosure, said method comprising:

- receiving a quantum program to be executed by the computing system, expressed as a quantum circuit;
- determining whether the quantum program is to be executed by the digital quantum computer or by the analog quantum computer of the computing system;
- responsive to determining that the quantum program is to be executed by the digital quantum computer, providing the quantum program to the digital quantum processing module; and
- responsive to determining that the quantum program is to be executed by the analog quantum computer, providing the quantum program to the DAC module.

According to a third aspect, the present disclosure relates to a computing system for executing quantum programs, said computing system comprising a classical computer, an analog quantum computer configured to execute quantum programs expressed as temporal schedules and a digital quantum computer configured to execute quantum programs expressed as quantum circuits, wherein said computing system comprises:

- a digital quantum processing module comprising an input interface for receiving a quantum program expressed as a quantum circuit to be executed by the digital quantum computer;
- an analog quantum processing module comprising an input interface for receiving a quantum program expressed as a temporal schedule to be executed by the analog quantum computer.

The computing system further comprises an analog to digital converting, ADC, module, to be executed by the classical computer, configured to convert a quantum program expressed as a temporal schedule into a quantum program expressed as a quantum circuit, said ADC module comprising an input interface for receiving a temporal schedule to be converted and an output interface for outputting a corresponding quantum circuit, and wherein a same format is used on the input interfaces of both the analog quantum processing module and the ADC module, and a same format is used on both the output interface of the ADC module and the input interface of the digital quantum processing module.

According to a fourth aspect, the present disclosure relates to a method for executing a quantum program by a computing system according to any one of the previous embodiments of the third aspect of the present disclosure, said method comprising:

- receiving a quantum program to be executed by the computing system, expressed as a temporal schedule;

determining whether the quantum program is to be executed by the digital quantum computer or by the analog quantum computer of the computing system;

responsive to determining that the quantum program is to be executed by the analog quantum computer, providing the quantum program to the analog quantum processing module; and responsive to determining that the quantum program is to be executed by the digital quantum computer, providing the quantum program to the ADC module.

BRIEF DESCRIPTION OF DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

DETAILED DESCRIPTION

As discussed above, the present disclosure relates to a computing system 10 for executing quantum programs.

Figure 1:
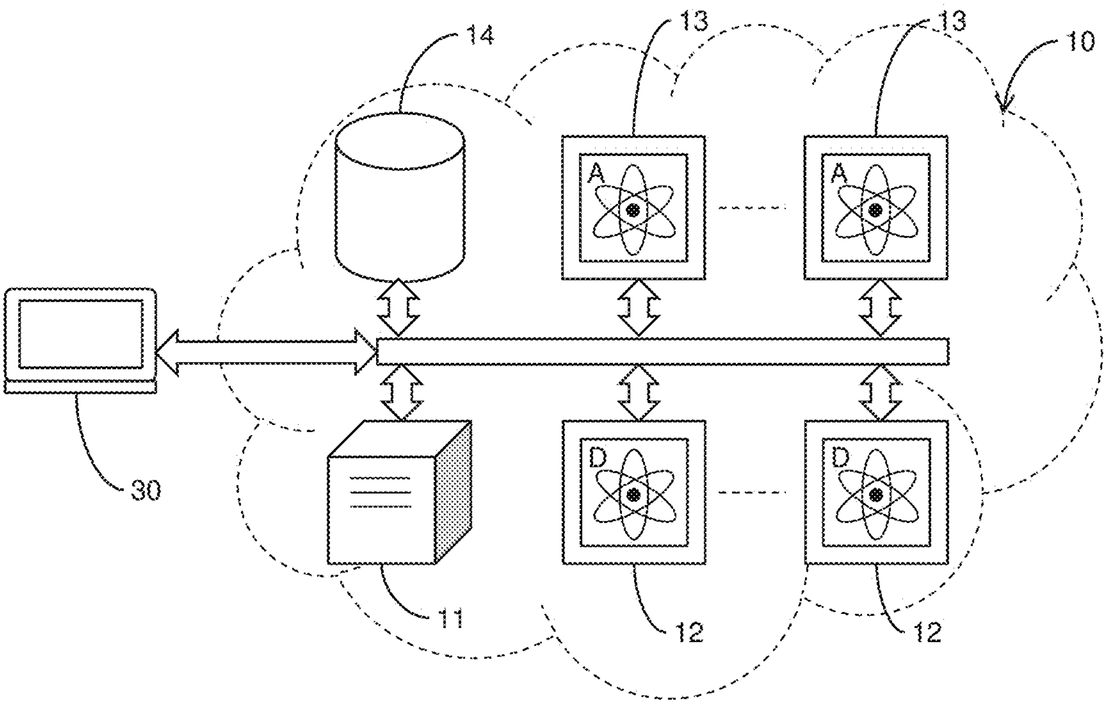
FIG. 1: a schematic representation of a computing system according to a preferred embodiment.

FIG. 1 represents schematically a non-limitative example of a computing system 10.

As illustrated by FIG. 1, the computing system 10 comprises hardware resources. Said hardware resources comprise quantum computing resources and classical computing resources.

The classical quantum computing resources comprise one or more classical computers 11. In the non-limitative example illustrated by FIG. 1, the classical computing resources comprise a single classical computer 11.

The quantum computing resources comprise one or more digital quantum computers 12 and one or more analog quantum computers 13.

As discussed above, a digital quantum computer 12 is a quantum gate-based computer, while an analog quantum computer 13 is a non-quantum gate-based computer (i.e. quantum annealing or adiabatic quantum computation).

In the non-limitative example illustrated by FIG. 1, the quantum computing resources comprise a plurality of digital quantum computers 12 and a plurality of analog quantum computers 13.

In preferred embodiments, all or part of the hardware resources are cloud computing resources. For instance, all or part of the classical computing resources may be cloud-based. Alternatively, or in combination, all or part of the hardware resources may be high performance computing, HPC, resources. For instance, all or part of the classical computing resources may be HPC-based.

The computing system 10 comprises also software resources to be executed on the hardware resources. In the example illustrated by FIG. 1, the software resources are stored in a database 14. This database 14 may be stored in a single physical entity or distributed on a plurality of different physical entities. In some cases, the database 14 may be cloud-based or HPC-based.

The hardware resources and the software resources of the computing system 10 may be accessed, for instance remotely, by a client device 30 used by a user willing to develop and execute a hybrid program.

The software resources, e.g. stored in the database 14 in the example of FIG. 1, comprise a plurality of processing modules.

The software resources comprise a digital quantum processing, DQP, module 22. The DQP module 22 comprises an input interface for receiving a quantum program expressed as a quantum circuit to be executed by a digital quantum computer 12 of the computing system 10. The DQP module 22 is the software resource which actually communicates with a digital quantum computer 12 for executing a quantum circuit received on its input interface. Such a DQP module 22 is executed at least in part by a digital quantum computer 12, but it can also be partly executed by a classical computer 11 which implements the input interface of the DQP module 22 and communicates with a remote or local target digital quantum computer 12 of the computing system 10.

The software resources comprise also an analog quantum processing, AQP, module 23. The AQP module 23 comprises an input interface for receiving a quantum program expressed as a temporal schedule to be executed by an analog quantum computer 13 of the computing system 10. The AQP module 23 is the software resource which actually communicates with an analog quantum computer 13 for executing a temporal schedule received on its input interface. Such an AQP module 23 is executed at least in part by an analog quantum computer 13, but it can also be partly executed by a classical computer 11 which implements the input interface of the AQP module 23 and communicates with a remote or local target analog quantum computer 13 of the computing system 10.

The computing system further comprises a digital to analog converting, DAC, module 24, to be executed by a classical computer 11.

The DAC module 24 is configured to convert a quantum program expressed as a quantum circuit into a quantum program expressed as a temporal schedule. For that purpose, the DAC module 24 comprises an input interface for receiving a quantum circuit to be converted and an output interface for outputting a corresponding temporal schedule. In the present disclosure, a same format is used on the input interfaces of both the DQP module 22 and the DAC module 24. Also, a same format is used on both the output interface of the DAC module 24 and the input interface of the analog quantum processing module. Hence, both the DQP module 22 and the DAC module 24 use the same (digital) API on their respective input interfaces, such that a same quantum circuit can be fed transparently to either the DQP module 22 or the DAC module 24. Also, the output interface of the DAC module 24 implements the (analog) API supported by the AQP module 23, such that the output of said DAC module 24 can be connected directly to the input of the AQP module 23.

Figure 2:
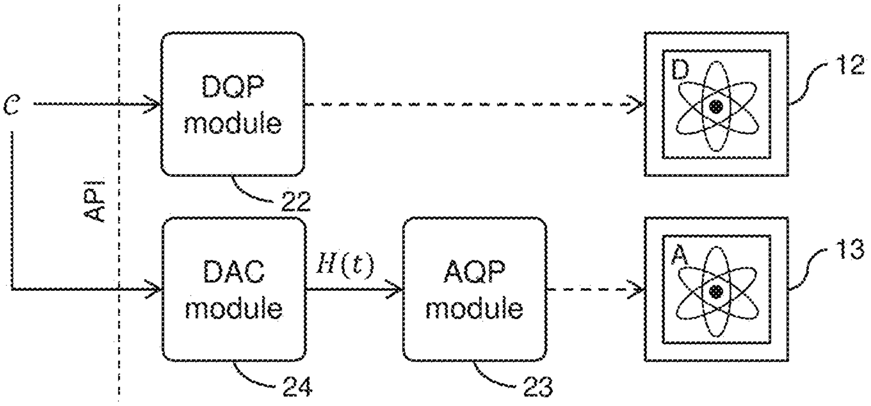
FIG. 2: a schematic representation of possible connections between software processing modules for executing a quantum program expressed as a quantum circuit.

Hence, as illustrated by FIG. 2, the computing system 10 enables a same quantum circuit C to be executed by a digital quantum computer 12 (via the DQP module 22) or by an analog quantum computer 13 (via the DAC module 24 connected to the AQP module 23). This is transparent to the quantum program developer since both the DAC module 24 and the DQP module 22 use the same (digital) API. The quantum program developer may decide to use a digital quantum computer 12 or an analog quantum computer 13, by including the corresponding processing modules in the quantum program or by notifying the computing system 10. However, the developer may also let the computing system 10 decide whether a digital quantum computer 12 or an analog quantum computer 13 should be used, for instance based on the availability of the different hardware resources when the quantum program is to be executed.

As discussed above, the DAC module 24 is configured to convert a quantum circuit into a corresponding temporal schedule, e.g. a temporal schedule that should yield the same results when executed on a target analog quantum computer 13 than the input quantum circuit when executed on a target digital quantum computer 12.

For instance, for each possible quantum gate (e.g. Pauli-X, Pauli-Y, Pauli-Z, Hadamard, CNOT, etc.) that can be included in a quantum circuit to be executed (and/or for each possible combination of quantum gates likely to be included in a quantum circuit to be executed), it is possible to determine beforehand a corresponding elementary schedule $H_i(t)$. An elementary schedule $H_i(t)$ (e.g. a time-dependent Hamiltonian operator) is for instance defined on a bounded time interval $[0; \Delta T_i]$, with $1 \leq i \leq N$ and N the number of possible quantum gates $U_i$. For a possible quantum gate $U_i$, the corresponding elementary schedule $H_i(t)$ is typically such that:

$$U_i \approx \exp\left(-\int_0^{\Delta T_i} H_i(t)dt\right)$$

For instance, when receiving on the input interface a quantum circuit consisting in two consecutive quantum gates $U_1$ and $U_2$, the DAC module 24 may determine a temporal planning for the elementary schedules $H_1(t)$ and $H_2(t)$, based on the execution order of said quantum gates of the quantum circuit. With two consecutive quantum gates, the temporal planning may consist in executing the elementary schedule $H_1(t)$ at $t_1$ and the elementary schedule at $H_2(t)$ at $t_2$, with e.g. $t_2-t_1 \geq \Delta T_1$ if the quantum gates $U_1$ and $U_2$ are applied on the same qubit. Hence, based on the quantum gates $U_1$ and $U_2$ and based on the temporary planning $t_1$ and $t_2$, the elementary schedules to be executed correspond respectively to $H_1(t-t_1)$ and $H_2(t-t_2)$. Hence the quantum circuit may be converted into a temporal schedule H(t) (time-dependent Hamiltonian operator) obtained by adding these elementary schedules as follows:

$$H(t) = H_1(t-t_1) + H_2(t-t_2)$$

Of course, other simplifications or optimizations could apply. For instance, if the quantum gates act on different qubits, both elementary schedules could be applied simultaneously instead of sequentially, etc.

It should be noted that the precise form of the elementary schedules $H_i(t)$ depends on the form of each possible quantum gate $U_i$ and on the hardware constraints of the target analog quantum computer 13.

As discussed above, the elementary schedules may be determined beforehand and applied on the fly by the DAC module 24 when receiving a quantum circuit. In preferred embodiments, these elementary schedules may be determined by the DAC module 24 itself during a calibration phase. During this calibration phase, the DAC module 24 seeks for optimal elementary schedules associated respectively to the possible quantum gates. For each possible quantum gate $U_i$, the DAC module 24 may output a plurality of candidate elementary schedules $\tilde{H}_i(t)$ to be executed by the analog quantum computer 13, via the AQP module 23. The DAC module 24 compares the results provided by the analog quantum computer 13 with a reference result for each possible quantum gate $U_i$, and determines an optimal elementary schedule $H_i(t)$ for said quantum gate $U_i$ as the candidate elementary schedule $\tilde{H}_i(t)$ which minimizes the difference between $U_i$ and $$\exp\left(-\int_0^{\Delta T_i} \tilde{H}_i(t)dt\right).$$

The optimal elementary schedules $H_i(t)$ are then used during a converting phase, for converting a quantum circuit into a temporal schedule.

Figure 3:
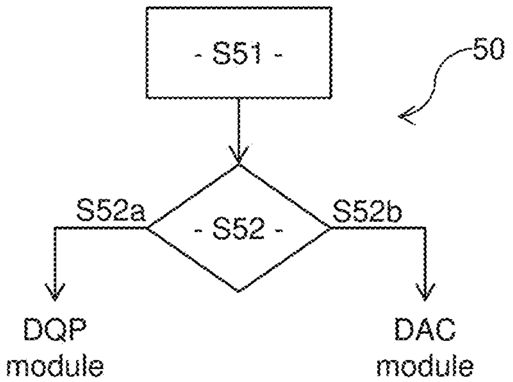
FIG. 3: a diagram illustrating the main steps of an exemplary embodiment of a method for executing a quantum program expressed as a quantum circuit.

FIG. 3 represents schematically the main steps of an exemplary embodiment of a method 50 for executing a quantum program by a computing system 10 comprising a DAC module 24. As illustrated by FIG. 3, the execution method 50 comprises:

- a step S51 of receiving a quantum program to be executed by the computing system 10, expressed as a quantum circuit;
- a step S52 of determining whether the quantum program is to be executed by a digital quantum computer 12 or by an analog quantum computer 13 of the computing system 10.

During step S52, the determination may use e.g. an indication received with the quantum program (e.g. if the quantum developer wants its quantum program to be executed by a specific quantum computer). However, in some cases, the computing system 10 may decide to use one among a digital quantum computer 12 or an analog quantum computer 13 based on other constraints, for instance based on the respective loads of the different quantum computers, etc.

If the computing system 10 determines that the quantum program is to be executed by a digital quantum computer 12 (reference S52*a* in FIG. 3), said computing system 10 provides the quantum program to a corresponding DQP module 22 (directly or indirectly).

If the computing system 10 determines that the quantum program is to be executed by an analog quantum computer 13 (reference S52*b* in FIG. 3), said computing system 10 provides the quantum program to a DAC module 24 (directly or indirectly), connected to a corresponding AQP module 23.

In preferred embodiments, the computing system 10 comprises an analog to digital converting, ADC, module 25, to be executed by the classical computer 11. Such an ADC module 25 is configured to convert a quantum program expressed as a temporal schedule H(t) into a quantum program expressed as a quantum circuit C. Said ADC module 25 comprises an input interface for receiving a temporal schedule H(t) to be converted and an output interface for outputting a corresponding quantum circuit C.

In the present disclosure, a same format is used on the input interfaces of both the AQP module 23 and the ADC module 25. Also, a same format is used on both the output interface of the ADC module 25 and the input interface of the DQP module 22. Hence, both the AQP module 23 and the ADC module 25 use the same (analog) API on their respective input interfaces, such that a same temporal schedule can be fed transparently to either the AQP module 23 or the ADC module 25. Also, the output interface of the ADC module 25 implements the (digital) API supported by the DQP module 22, such that the output of said ADC module 25 can be connected directly to the input of the DQP module 22.

Figure 4:
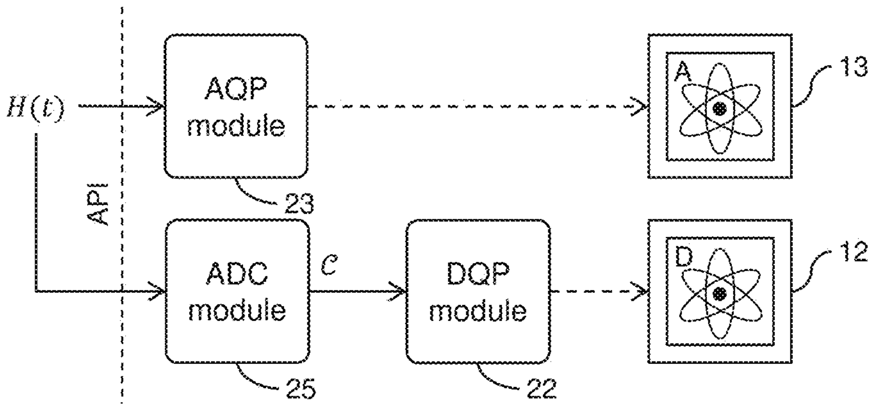
FIG. 4: a schematic representation of possible connections between software processing modules for executing a quantum program expressed as a temporal schedule.

Hence, as illustrated by FIG. 4, the computing system 10 enables a same quantum circuit temporal schedule H(t) to be executed by an analog quantum computer 13 (via the AQP module 23) or by a digital quantum computer 12 (via the ADC module 25 connected to the DQP module 22). This is transparent to the quantum program developer since both the ADC module 25 and the AQP module 23 use the same (analog) API. The quantum program developer may decide to use a digital quantum computer 12 or an analog quantum computer 13, by including the corresponding processing modules in the quantum program or by notifying the computing system 10. However, the developer may also let the computing system 10 decide whether a digital quantum computer 12 or an analog quantum computer 13 should be used, for instance based on the availability of the different hardware resources when the quantum program is to be executed.

The ADC module 25 performs basically the inverse processing of the processing applied by the DAC module 24. For instance, the temporal schedule to be converted may be composed of predetermined possible elementary schedules $H_i(t)$ and, for each of these possible elementary schedules $H_i(t)$, a corresponding quantum gate $U_i$ (or a combination of quantum gates, i.e. a quantum sub-circuit) may be determined beforehand, and used to convert an input temporal schedule H(t) into a corresponding quantum circuit C e.g. via a Trotterization process or Trotter decomposition.

Figure 5:
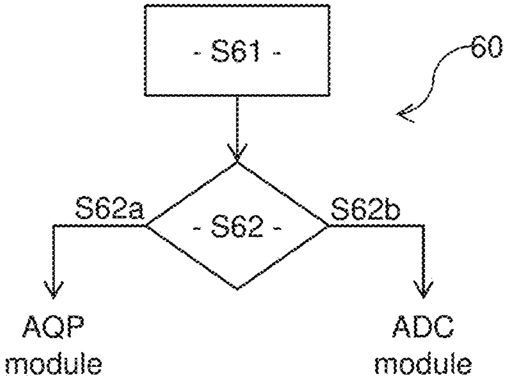
FIG. 5: a diagram illustrating the main steps of an exemplary embodiment of a method for executing a quantum program expressed as a temporal schedule.

FIG. 5 represents schematically the main steps of an exemplary embodiment of a method 60 for executing a quantum program by a computing system 10 comprising an ADC module 25. As illustrated by FIG. 5, the execution method 60 comprises:

- a step S61 of receiving a quantum program to be executed by the computing system 10, expressed as a temporal schedule;
- a step S62 of determining whether the quantum program is to be executed by a digital quantum computer 12 or by an analog quantum computer 13 of the computing system 10.

During step S62, the determination may use e.g. an indication received with the quantum program (e.g. if the quantum developer wants the quantum program to be executed by a specific quantum computer). However, in some cases, the computing system 10 may decide to use one among a digital quantum computer 12 or an analog quantum computer 13 based on other constraints, for instance based on the respective loads of the different quantum computers, etc.

If the computing system 10 determines that the quantum program is to be executed by an analog quantum computer 13 (reference S62*a* in FIG. 5), said computing system 10 provides the quantum program to a corresponding AQP module 23 (directly or indirectly).

If the computing system 10 determines that the quantum program is to be executed by a digital quantum computer 12 (reference S62*b* in FIG. 3), said computing system 10 provides the quantum program to an ADC module 25 (directly or indirectly), connected to a corresponding DQP module 22.

Figure 6:
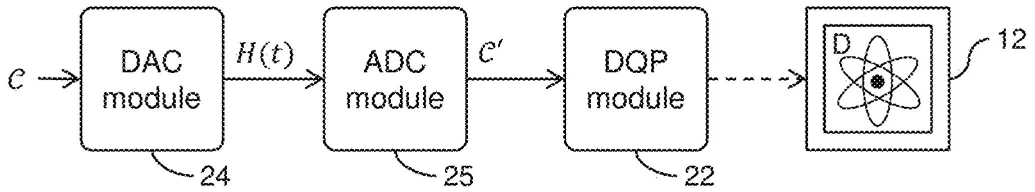
FIGS. 6 and 7: schematic representations of exemplary embodiments performing temporal schedules optimization.

It should be noted that, in a computing system 10 comprising both a DAC module 24 and an ADC module 25, the computing system 10 is also adapted to execute e.g. a quantum program expressed as a quantum circuit by using a digital quantum computer 12 via the DAC module 24 connected to the ADC module 25, as illustrated by FIG. 6. This is transparent since the output interface of the DAC module 24 and the input interface of the ADC module use the same (analog) API. This can be useful e.g. if one wants to use quantum programs optimizing algorithms which are available in the analog quantum framework on a quantum program expressed as a quantum circuit. Hence, in such a case, it might be useful to convert the quantum circuit C into a temporal schedule H(t) on which such optimizing algorithms may be applied to produce an optimized temporal schedule H'(t), which may then be converted back into a corresponding quantum circuit C'.

FIG. 6 represents schematically an example in which the optimization algorithms are implemented by the ADC module 25. It is emphasized that, in other examples, the optimization algorithms can also be implemented by the DAC module 24 (in which case the DAC module 24 would produce directly the optimized temporal schedule H'(t)).

Figure 7:
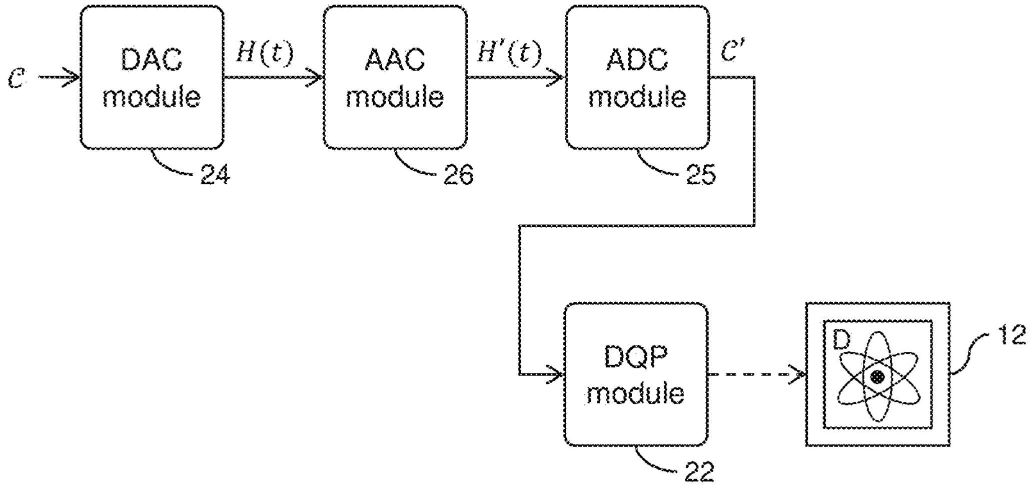

FIG. 7 represents schematically another example in which the optimization is implemented by a specific processing module, referred to as analog to analog, AAC, module 26, to be executed by a classical computer 11. The AAC module 26 is configured to optimize a temporal schedule and comprises an input interface for receiving a temporal schedule H(t) to be optimized and an output interface for outputting a corresponding optimized temporal schedule H'(t). The input interface and the output interface of the AAC module 26 use the same format as the input interface of the ADC module 25, such that its input interface can be transparently connected to e.g. an output interface of a DAC module 24 and its output interface can be transparently connected to e.g. an input interface of a AQP module 23 or of an ADC module 25, as illustrated in FIG. 7.

The optimization algorithms carried out by the ADC module 25 (or the DAC module 24) or by the AAC module 26 aim at converting the temporal schedule H(t) into an equivalent temporal schedule H'(t) having better properties with respect to a predetermined performance criterion. Examples of possible performance criteria include the total duration of the temporal schedule (to be minimized), the compliance with constraints such as a limited slope for the time-varying fields that enter into the definition of the temporal schedule, the compliance with the operation set available, the minimization of leakage of population to higher levels, the robustness to quantum noise, the use of parallel controls, etc. Such optimization algorithms are considered known to the skilled person. Different types of performance criteria/optimization algorithms may be considered in the present disclosure, and the choice of a specific type of performance criterion/optimization algorithm corresponds merely to a specific embodiment of the present disclosure.

It is emphasized that the present invention is not limited to the above exemplary embodiments. Variants of the above exemplary embodiments are also within the scope of the present invention.

For instance, the present disclosure has been provided by focusing on a computing system 10 comprising at least a DAC module 24. However, the present disclosure applies also to the case e.g. of a computing system 10 comprising an ADC module 25 and no DAC module 24. Such a computing system 10 may be used e.g. to implement an execution method 60 as described in reference to FIG. 5, inter alia.

The invention claimed is:

1. A computing system for executing quantum programs, said computing system comprising a classical computer, an analog quantum computer configured to execute quantum programs expressed as temporal schedules and a digital quantum computer configured to execute quantum programs expressed as quantum circuits, wherein said computing system further comprises:

a digital quantum processing module comprising an input interface for receiving a quantum program expressed as a quantum circuit to be executed by the digital quantum computer;

an analog quantum processing module comprising an input interface for receiving a quantum program expressed as a temporal schedule to be executed by the analog quantum computer;

a digital to analog converting, DAC, module, to be executed by the classical computer, configured to convert a quantum program expressed as a quantum circuit into a quantum program expressed as a temporal schedule, said DAC module comprising an input interface for receiving a quantum circuit to be converted and an output interface for outputting a corresponding temporal schedule generated by converting the quantum program;

wherein a same format is used on respective input interfaces of both the digital quantum processing module and the DAC module, and a same format is used on both the output interface of the DAC module and the input interface of the analog quantum processing module;

wherein the computing system further comprises an analog to digital converting, ADC, module, to be executed by the classical computer, configured to convert a quantum program expressed as a temporal schedule into a quantum program expressed as a quantum circuit, said ADC module comprising an input interface for receiving a temporal schedule to be converted and an output interface for outputting a corresponding quantum circuit generated by converting the quantum program, wherein a same format is used on the respective input interfaces of both the analog quantum processing module and the ADC module, and a same format is used on both the output interface of the ADC module and the input interface of the digital quantum processing module, wherein the DAC module is connected to the ADC module through the output interface of the DAC module and the input interface of the ADC module.

2. The computing system according to claim 1, wherein: the DAC module is configured to optimize a temporal schedule, obtained by converting a quantum circuit, with respect to a predetermined performance criterion, and to output the optimized temporal schedule.

3. The computing system according to claim 1, comprising an analog to analog converting, AAC, module, to be executed by the classical computer, configured to optimize a temporal schedule with respect to a predetermined performance criterion, said AAC module comprising an input interface for receiving a temporal schedule and an output interface for outputting a corresponding optimized temporal schedule, wherein the input interface and the output interface of the AAC module use the same format as the input interface of the ADC module.

4. The computing system according to claim 1, wherein the DAC module is configured to perform a calibration phase wherein, for each possible quantum gate that can be included in a quantum circuit to be executed, the DAC module outputs a plurality of candidate elementary schedules to be executed by the analog quantum computer and determines an optimal elementary schedule for said quantum gate by comparing the results provided by the analog quantum computer with a reference result, and wherein the DAC module uses optimal elementary schedules determined for all possible quantum gates for converting a quantum circuit into a temporal schedule.

5. The computing system according to claim 1, wherein the DAC module is configured to:

receive a quantum program expressed as a quantum circuit comprising a plurality of quantum gates to be applied to a set of qubits, said quantum gates arranged successively in an execution order;

determine a temporal planning based on the execution order of the quantum gates of the quantum circuit;

for each quantum gate or combination of quantum gates: determining an associated elementary schedule based on said quantum gate and based on said temporal planning;

transmitting a quantum program expressed as a temporal schedule obtained by adding the elementary schedules.

6. A method for optimizing a quantum program by the computing system according to claim 1, comprising:

receiving a quantum program to be executed by the computing system, expressed as a quantum circuit;

providing the quantum circuit to the input interface of the DAC module for converting the quantum circuit into the quantum program expressed as a temporal schedule;

performing a quantum program optimization algorithm on the temporal schedule to produce an optimized temporal schedule; and providing the optimized temporal schedule to the input interface of the ADC module for converting the optimized temporal schedule into an optimized quantum circuit.

7. A computing system for executing quantum programs, said computing system comprising a classical computer, an analog quantum computer configured to execute quantum programs expressed as temporal schedules and a digital quantum computer configured to execute quantum programs expressed as quantum circuits, wherein said computing system further comprises:

a digital quantum processing module comprising an input interface for receiving a quantum program expressed as a quantum circuit to be executed by the digital quantum computer; an analog quantum processing module comprising an input interface for receiving a quantum program expressed as a temporal schedule to be executed by the analog quantum computer;

wherein the computing system further comprises an analog to digital converting, ADC, module, to be executed by the classical computer, configured to convert a quantum program expressed as a temporal schedule into a quantum program expressed as a quantum circuit, said ADC module comprising an input interface for receiving a temporal schedule to be converted and an output interface for outputting a corresponding quantum circuit generated by converting the quantum program;

wherein a same format is used on respective input interfaces of both the analog quantum processing module and the ADC module, and a same format is used on both the output interface of the ADC module and the input interface of the digital quantum processing module;

wherein the computing system further comprises a digital to analog converting, DAC, module, to be executed by the classical computer, configured to convert a quantum program expressed as a quantum circuit into a quantum program expressed as a temporal schedule, said DAC module comprising an input interface for receiving a quantum circuit to be converted and an output interface for outputting a corresponding temporal schedule generated by converting the quantum program;

wherein a same format is used on the respective input interfaces of both the digital quantum processing module and the DAC module, and a same format is used on both the output interface of the DAC module and the input interface of the analog quantum processing module, wherein the ADC module is connected to the DAC module through the output interface of the ADC module and the input interface of the DAC module.

8. The method according to claim 6, wherein the computing system comprises an analog-to-analog converting, AAC, module, to be executed by the classical computer, wherein the method further comprises:

optimizing the temporal schedule with respect to a predetermined performance criterion by providing the temporal schedule to the AAC module, said AAC module comprising an input interface for receiving a temporal schedule and an output interface for outputting a corresponding optimized temporal schedule, wherein the input interface and the output interface of the AAC module use the same format as the input interface of the ADC module.

9. The computing system according to claim 2, wherein the predetermined performance criterion comprises one or more of a total duration of the temporal schedule, a leakage of population to higher levels, a robustness to quantum noise, a use of parallel controls, and a compliance with a constraint comprising one or more of a limited scope for time-varying fields, and an operation set available.

10. The computing system according to claim 3, wherein the predetermined performance criterion comprises one or more of a total duration of the temporal schedule, a leakage of population to higher levels, a robustness to quantum noise, a use of parallel controls, and a compliance with a constraint comprising one or more of a limited scope for time-varying fields, and an operation set available.

11. The method according to claim 8, wherein the predetermined performance criterion comprises one or more of a total duration of the temporal schedule, a leakage of population to higher levels, a robustness to quantum noise, a use of parallel controls, and a compliance with a constraint comprising one or more of a limited scope for time-varying fields, and an operation set available.

12. The computing system according to claim 7, wherein:

the ADC module is configured to optimize a temporal schedule with respect to a predetermined performance criterion, and to convert the optimized temporal schedule into a quantum circuit.

13. The computing system according to claim 7, wherein the DAC module is configured to perform a calibration phase wherein, for each possible quantum gate that can be included in a quantum circuit to be executed, the DAC module outputs a plurality of candidate elementary schedules to be executed by the analog quantum computer and determines an optimal elementary schedule for said quantum gate by comparing the results provided by the analog quantum computer with a reference result, and wherein the DAC module uses optimal elementary schedules determined for all possible quantum gates for converting a quantum circuit into a temporal schedule.

14. The computing system according to claim 7, wherein the DAC module is configured to:

receive a quantum program expressed as a quantum circuit comprising a plurality of quantum gates to be applied to a set of qubits, said quantum gates arranged successively in an execution order;

determine a temporal planning based on the execution order of the quantum gates of the quantum circuit;

for each quantum gate or combination of quantum gates: determining an associated elementary schedule based on said quantum gate and based on said temporal planning; and transmitting a quantum program expressed as a temporal schedule obtained by adding the elementary schedules.

15. The computing system according to claim 7, wherein the predetermined performance criterion comprises one or more of a total duration of the temporal schedule, a leakage of population to higher levels, a robustness to quantum noise, a use of parallel controls, and a compliance with a constraint comprising one or more of a limited scope for time-varying fields, and an operation set available.

* * * * *